(No Model.)

3 Sheets—Sheet 1.

J. WHITNEY.

PLANING MACHINE.

No. 3,110.

Reissued Sept. 1, 1868.

Witnesses.

Jno. D. Patten

M. Wood

Joel Whitney,

By atty. A. B. Stoughton.

THE NORRIS PETERS CO., PHOTO-LITHO., WASHINGTON, D. C.

(No Model.)

3 Sheets—Sheet 2.

J. WHITNEY.

PLANING MACHINE.

No. 3,110.

Reissued Sept. 1, 1868.

Witnesses.

Jno. D. Patten

F. M. Pool

Joel Whitney,

By atty, A. B. Stoughton.

THE NORRIS PETERS CO., PHOTO-LITHO., WASHINGTON, D. C.

(No Model.)

J. WHITNEY.

PLANING MACHINE.

3 Sheets—Sheet 3.

No. 3,110.

Reissued Sept. 1, 1868.

Witnesses.

Jno. D. Patten

M. Bol

Joel Whitney,

By atty. A. B. Stoughton.

THE NORRIS PETERS CO., PHOTO-LITHO., WASHINGTON, D. C.

United States Patent Office.

JAMES A. WOODBURY, OF BOSTON, ASSIGNEE OF JOEL WHITNEY, OF WINCHESTER, MASSACHUSETTS.

*Letters Patent No.* 8,881, *dated April* 13, 1852; *extended seven years; reissue No.* 2,676, *dated July* 9, 1867; *reissue No.* 3,110, *dated September* 1, 1868.

IMPROVEMENT IN PLANING-MACHINES.

The Schedule referred to in these Letters Patent and making part of the same.

TO ALL PERSONS TO WHOM THESE PRESENTS SHALL COME:

Be it known that JOEL WHITNEY, of Winchester, in the county of Middlesex, and State of Massachusetts, did invent certain new and useful Improvements in Machines for Tonguing and Grooving and Planing Boards; and that the following description, taken in connection with the accompanying drawings, hereinafter referred to, forms a full and exact specification of the same, wherein I have set forth the nature and principles of his said improvements, by which the invention may be distinguished from others of a similar class, together with such parts as I claim, and desire to have secured to me by Letters Patent.

The figures of the accompanying plate of drawings represent said improvements.

Figure 1:
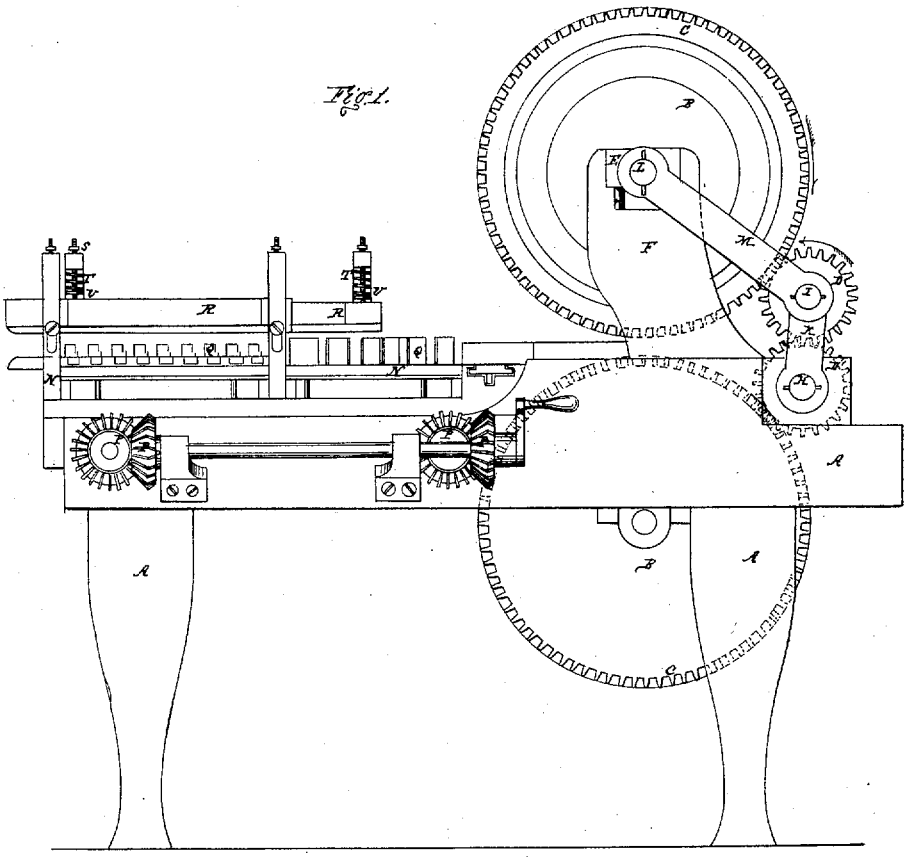
Figure 1 is a side elevation of the machine.
Figure 2:
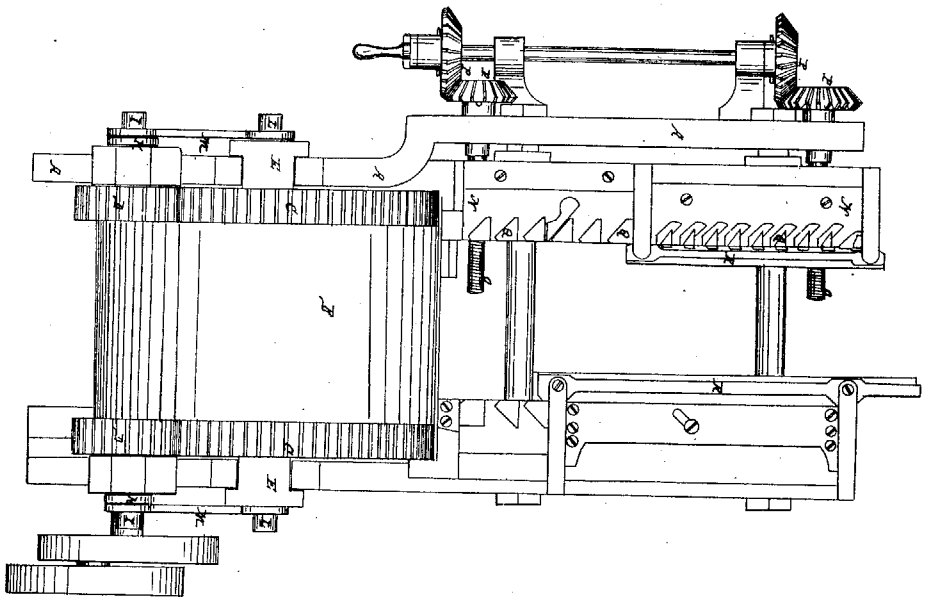
Figure 2 is a plan of the same.
Figure 4:
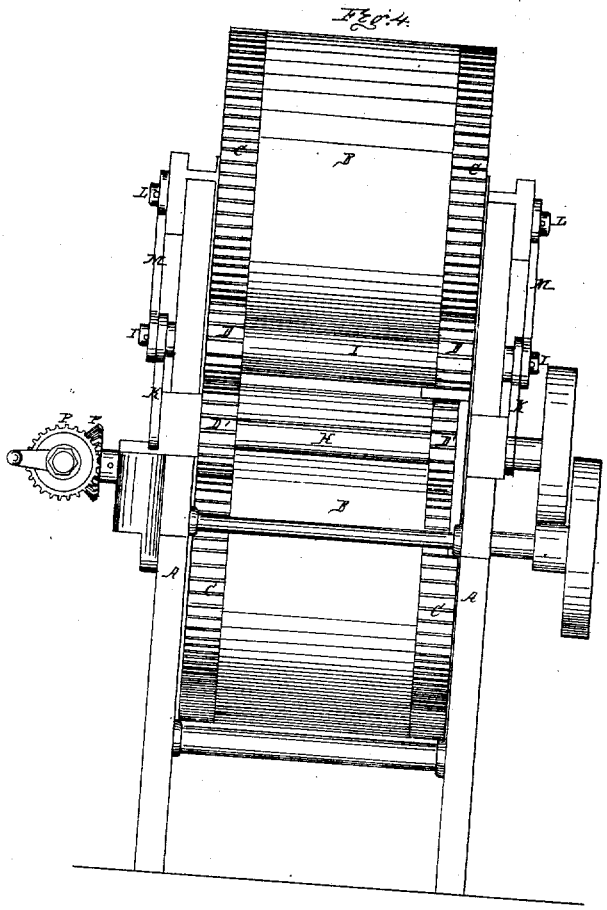

The essential features of said improvements consist, first, in the manner of gearing and connecting the two feed-rolls by a duplicate system of gearing, so that the upper roll will yield to any inequality in the board in a direction perpendicular to its surface, and also be drawn down upon the surface to which it has yielded, in proportion to the resistance to the forward movement of the board.

As these machines have usually been constructed, the lower guide-rail for holding the board has been made movable, so as to yield, in case of any shavings or other obstructions getting between the board and said rails, but, by thus allowing the lower rail, and consequently the board, to yield, while the cutting-tools were stationary, an irregular tongue or groove was necessarily formed in the board.

In said machine, this defect is remedied by making the upper guide-rail movable, while the lower one is stationary, so that in case of any obstruction, the upper rail alone moves, while the board keeps in the same position, with regard to the cutting-tools, as before.

A A A, in the drawings, represent the framework of the machine. B B are the two feed-rolls, having on each end the large gear-wheels C C, which are connected to each other by the small gear-wheels D D′. The bearings E E of the upper roll are allowed to play up and down in the standards F F, perpendicularly to the board operated upon.

The driving-shaft H, on which the gear-wheel D′ is placed, is connected to the shaft I, on which is the wheel D, by the short movable vertical arm K, and this shaft I is connected to the shaft L of the upper roll by the inclined moving arm M, thus connecting the shaft of the stationary wheel D′ to the vertical-sliding bearings of the upper feed-roll.

It will be seen, as the wheel D′ revolves, it will continually have a tendency to force the gear D, (the shaft of which is movable, having its bearings in the two arms K M,) from the roll, or out of connection with the gear C, and having this tendency, the wheel D will, through the medium of the arm M, draw down upon the roll, in proportion to the power applied, which depends upon the resistance to the forward movement of the board.

N N is the movable slide, which is fed up on the screws O O by the bevel-gears P P, &c.

Q Q are the stocks for the cutting-tools, constructed and placed in the same manner as in other machines, and as shown in the drawings.

Figure 3:
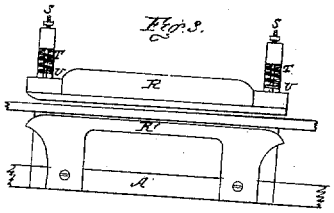
Figure 3 is a detail view of the guide-rails, &c., which hold the board.

R R′, fig. 3, are the guide-rails, the lower one, R′, being stationary, while the upper one, R, is movable and adjustable, being held by the screws S S, around which are the spiral springs T T, which bear against the nuts U U.

By the above-described arrangement, it will be seen that when any obstruction gets between the guide-rails and the board, the upper one, by the nuts U U, pressing against the springs S S, will rise, while the board will remain perfectly level upon the lower guide, and thus prevent the tongue or groove from becoming irregular.

The great advantages of connecting the feed-rolls by the duplicated system of gearing at either end of the same in the manner shown, is due to several important conditions in the working of a planing or tonguing-and-grooving machine. In the first place, the movable feed-roll must rise and fall perpendicularly to the board, in order to present it to the cutting-apparatus at all times in precisely the same direction, whatever may be its thickness, so that the board may rest firmly on the bed of the machine, and preserve a constant relation between its lower side and the said cutting-apparatus. It is also necessary that the axis of the movable roll should be kept substantially parallel with that of the stationary roll, else, as they revolve, they will tend to follow different directions on the two sides of the board, and the surface of one of them must slip on the board, causing an enormous friction and strain, and wear of the bearings and gears, with frequent breakage of the latter. Again, where the power is applied to one end only of the movable feed-roll, the tendency is to throw the roll out of parallelism with the stationary roll to the full extent of the power applied thereto, thus producing an unequal wear of the bearings and the tilting of the roll to one side if the board is narrow. With a single system of connecting-gears, the movable roll is thrown out of parallelism if the board is inserted near one side, or if one edge is much thicker than the other, which interferes with the proper working of the gears, and causes their rapid destruction, both by wear and the breaking of the teeth. All of these difficulties are avoided by the duplicate system of gearing shown, and those parts are rendered as durable as the others. It is obvious that this method of connecting the feed-rolls by a duplicate system of gearing, and also the arrangement by which the feed-roll is made to bear upon the board in the manner above described, can be applied to machines for planing as well as to machines for tonguing and grooving, and also that the lower feed-roll may be made movable and the upper one stationary, which arrangement will work equally well by simply having a spring or weight to counterbalance the weight of said lower roll. The feed-rollers may be fluted or otherwise roughened for the better holding of the board to be operated upon.

I do not broadly claim gearing the feed-rollers with each other by means of pairs of movable pinions, connected to each other and to the feed-rollers by links, this having already been done.

What I claim as the invention of said WHITNEY, and desire to have secured to me by Letters Patent, is—

1. The method of connecting the movable feed-roll to the stationary roll, when moving towards and from the same, in a constant plane, perpendicular to the board, by a duplicate system of similar gears at either end of the same, substantially as described.

2. The arrangement of mechanism by which the upper feed-roll is allowed to yield to any inequalities in the board, and at the same time is drawn down upon its surface to which it has yielded in proportion to the resistance to its progress, substantially as described.

3. In combination with a pair of feed-rolls geared and driven from both of their ends, and the duplicate sets of intermediate gears working in and with them, the connecting of said intermediate or driving-gears by substantial shafts extending clear across from one set to the opposite set, by which the lifting and driving are done at both ends of the rolls, and the twisting, bending, or straining of journals or bearings avoided, substantially as described.

4. The arrangement of the gears D, loosely, so as to turn upon their movable but non-rotating connecting-shaft I, so that said shaft and gears may be free to accommodate themselves to the yielding feed-roll, and avoid the necessity of movable journal-boxes or bearings, substantially as represented, and for the purpose described.

JAMES A. WOODBURY.

Witnesses:

A. B. STOUGHTON,

EDMUND MASSON.